J. K. WILLIAMS.
CORE FOR MANUFACTURING PNEUMATIC TIRES.
APPLICATION FILED OCT. 26, 1908.

948,489.

Patented Feb. 8, 1910.

WITNESSES
Glenara Fox
Evelyn Blinn

INVENTOR
John K. Williams
by C. E. Humphrey,
ATTORNEY.

UNITED STATES PATENT OFFICE.

JOHN K. WILLIAMS, OF AKRON, OHIO, ASSIGNOR OF ONE-HALF TO THE WILLIAMS FOUNDRY AND MACHINE COMPANY, A CORPORATION OF OHIO.

CORE FOR MANUFACTURING PNEUMATIC TIRES.

948,489.

Specification of Letters Patent. Patented Feb. 8, 1910.

Application filed October 26, 1908. Serial No. 459,572.

*To all whom it may concern:*

Be it known that I, JOHN K. WILLIAMS, a citizen of the United States, residing at Akron, in the county of Summit and State of Ohio, have invented new and useful Improvements in Cores for Manufacturing Pneumatic Tires, of which the following is a specification.

This invention relates to collapsible cores or mandrels for manufacturing pneumatic tires of the double-tube type having inextensible bands or selvages.

In constructing the outer tubes or wear-resisting casings of pneumatic tires, an annularly-formed core or mandrel is employed on which the successive layers of rubber and fabric or rubber saturated fabric are built up and during the building process the edges or selvages of the tire adapted to engage the retaining means of the wheel rim are so made or formed as to render them substantially inextensible. In consequence of the fact that these edges cannot be stretched and that the tire is annularly-formed with the circumferential opening therein inwardly, it becomes necessary to construct the core in such a manner that it can be collapsed or withdrawn from the interior of the completed tire through the opening existing between its rim-engaging edges.

The object of this invention therefore is, broadly speaking, to construct a core upon which the tire may be built, which may be easily and successfully removed from the interior of the tire at any time after its completion.

A further object of this invention is to construct the tire with a plurality of segmental portions adapted to be united to form an annular core and provided with means for fixedly securing the several members to each other without the necessity of employing means independent thereof for maintaining them in coöperating relation.

A still further object is to construct a core for the purpose described which will be lighter than those now in use, strong, durable, easy to make, readily set up and quickly removed from the interior of the tire casing.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 1:
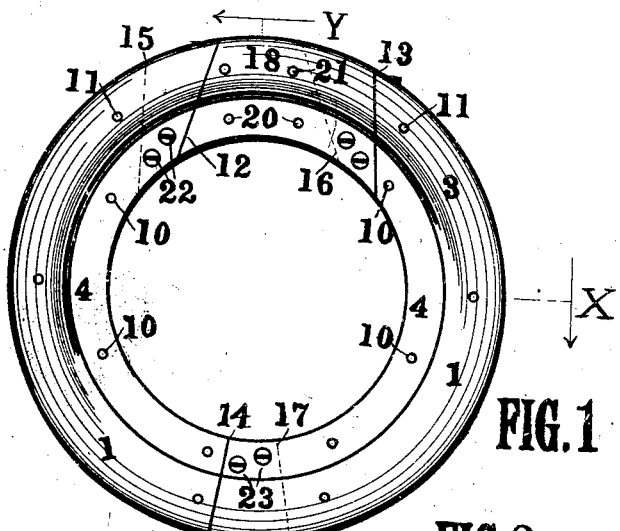
Figure 4:
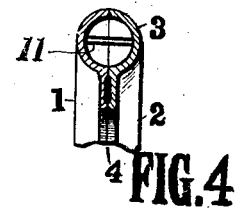
Figure 2:
Figure 5:
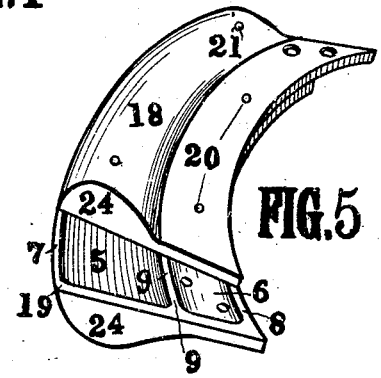
Figure 3:
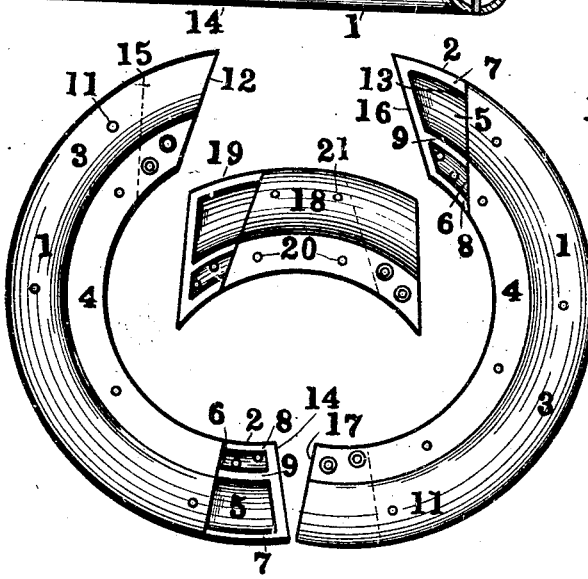

In the drawings, in which similar reference numerals indicate like parts in the different figures: Figure 1 is a view in side elevation of a core constructed in accordance with this invention, ready for use. Fig. 2 is a section of Fig. 1 on line X thereof. Fig. 3 is a view similar to Fig. 1 with the members of the core separated. Fig. 4 is a sectional view of Fig. 1 on line Y; and, Fig. 5 is a perspective view of one of the segments of the tire.

It is believed that the description of the device will be better understood by giving a detailed statement of the manner of constructing the same.

In making a core such as is shown in the drawings, I prefer to make it of cast metal, although I do not confine myself to this material and in producing the same I first form two annular similar members 1 and 2 having the exterior surfaces thereof of the shape which it is desired to impart to the interior of the tire casing, having preferably rounded portions 3 and inwardly-extending flanges 4. In order to reduce weight, the members 1 and 2 are provided with circumferentially-extending recesses 5 in their rounded portions and with similar recesses 6 in the flanged portions thereof, said recesses being surrounded by circumferentially-extending ridges or edges 7 and 8, the recesses in the rounded portions being separated from the recesses in the flanged portion by dividing ridges 9, the faces of the ridges 7, 8 and 9 being in the same plane so that when the two members of the device are placed in coöperating relation with the recessed faces thereof in contact, each ridge 7, 8 or 9 of one member will register with a corresponding ridge of the other member and the recesses 5 and 6 of one member will register with a similar recess in the other. The two members when in abutting relation are connected by pins 10 extending through the flanged portions 4 and by pins 11 extending through the rounded portions of the same so that the members are firmly united to each other. The two members are then placed in a suitable machine, such as a lathe, and the outer surfaces thereof turned to the desired size and configuration which it is intended to impart to the tire casing to be built thereon. When the smoothing and shaping of the exterior surfaces of the now assembled device are completed, a number of oblique cuts 12, 13 and 14 are then made through the member 1 and similar cuts 15, 16 and 17 are made through the member 2. Then the portion between the cuts 12 and 13 of the member 1, hereinafter designated by the reference numeral 18, may be readily removed by withdrawing it inwardly toward the center of the core, by reason of the fact that the cuts 12 and 13 form the portion 18 with wedge-shaped ends and this peculiar formation will permit the withdrawal of this segment inwardly. The segment of the member 2, situated between the cuts 15 and 16, hereinafter designated by the reference numeral 19, is then removed in a similar manner and afterward the two members 18 and 19 are preferably secured together for convenience in handling, so that when it is desired to remove these two segments, time will be saved by uniting them to reduce the number of parts necessarily manipulated by the operator and this is done by pins 20 passing through their abutting flanged portions and by means of pins 21 through their rounded portions. It will be entirely obvious of course that the device will be as efficient if the two members 18 and 19 are not secured together, although the preferred construction is to unite them, as just described. It will be seen that when these two members 18 and 19 are positioned, the end of the member 18 adjacent the cut 13 will overlap that portion of the member 2 which is contained between the cut 16 and the end of the member 1 formed by the cut 13 and at the same time the extended end of the member 19 will lap the portion of the member 1 between the cuts 12 and 15. It will be readily seen that when united together, the members 18 and 19 may be withdrawn inwardly toward the center of the core and when replaced the ends of the united members 18 and 19 will abut against the ends of the members 1 and 2 and perfectly fit in the opening formed between their spaced ends and also that one end of the member 18 will lap the member 2 and one end of the member 19 will lap a portion of the end of the member 1.

The construction of the ends of the severed body portion of the core is such that the separated ends thereof are alternately rabbeted in such a manner that if the segment comprising members 18 and 19 is placed therein the sides thereof will interlock by reason of the fact that the alternate ends of the members 18 and 19 extend past one another to constitute corresponding rabbeted portions to coöperate with the severed ends of the main body portion of the mold.

In order to secure the members 18 and 19 in proper position in the opening formed between the severed ends of the members 1 and 2, suitable holdfast devices such as screws 22 are employed, which pass through the flanged portions of both of the members 18 and 19.

The cuts 14 and 17 through the members 1 and 2 respectively, are alternately disposed in position with respect to each other and are spaced apart in such a manner that each of the members is provided with an extended portion constituting in connection with the balance of the end of each member a rabbeted part, so that the extended end of the portion of each of said members will overlap a complementary portion of the other member, as clearly shown in Fig. 3 and when in engaging relation with each other the members are held together through the medium of screws 23.

In using a core such as has just been described, the members are assembled as shown in Fig. 1 and the tire casing built up in any approved manner. When completed, if desired, or after construction, the members composing the core are separated in the following manner. The screws 22 are first removed, permitting the withdrawal of the united members 18 and 19 inwardly toward the space surrounded by the core. After this the screws 23 are removed and the two remaining portions of the core may then be withdrawn from the interior of the tire casing, without trouble, after which the members are reassembled for use in connection with the building of a second tire casing.

It will be obvious of course that instead of making the core in three pieces, as shown in the drawings, any number of segments may be employed provided that they are so made that portions of adjacent members overlap each other and also provided that the first segment removed is wedge-shaped or provided with inclined or oblique edges to permit of the withdrawal inwardly of the section contained between the oblique ends.

It will be noted in constructing this device that the ends of each section thereof are adapted to abut against one another snugly when the parts are assembled, as shown in Fig. 1, and it will be further pointed out that in forming the two members 1 and 2, the recesses forming the hollow interiors thereof are interrupted at the ends of each segment by transverse end portions 24, shown best in Fig. 5, both for the purpose of strengthening the respective segments, as well as to afford a firm seat for the various abutting portions when assembled. These transverse portions 24 which extend across the members 1 and 2 are preferably formed in the two members 1 and 2 during the manufacture thereof and are so positioned that when the cuts 12, 13, 14, 15, 16 and 17 are made, they each bisect one of these.

What I claim and desire to secure by Letters Patent, is:—

1. A collapsible core for manufacturing tires comprising an annular body having as a part thereof a removable section adapted to laterally overlap at least one end of the remaining portion of the body, and means extending through the overlapping portion of said removable section and the remaining portion of the body for detachably holding said removable section in position.

2. A collapsible core for manufacturing tires comprising an annular body having as a part thereof a removable section formed with a pair of oblique shoulders at points removed from the ends thereof, the remaining portion of said body provided with a pair of oblique shoulders positioned at points removed from the ends thereof, the shoulders of said section adapted to abut against the shoulders of said body, and means extending through said section and the remaining portion of said body for detachably holding said removable section in position.

3. A collapsible core for manufacturing tires comprising an annular body having as a part thereof a removable section, said body of the same contour throughout and comprising a cylindrical outer portion and an inwardly-extending integral annular flange, and a transversely-extending means projecting through said removable section and the remaining portion of the body for detachably coupling the section and the remaining portion of the body together.

4. A collapsible core for manufacturing tires comprising an annular body formed of a plurality of segments, said segments laterally overlapping at their opposing ends, and transversely-extending means projecting through the overlapping ends of the segments for detachably-connecting the segments together.

5. A collapsible core comprising two members having the outer portion thereof formed approximately semi-circular in cross-section and with inwardly-extending flanges, said members adapted to be permanently united to constitute a body portion, said members being provided with united segment-shaped removable portions adapted when positioned to lap adjacent portions of said members and means for securing said removable united members in position.

6. A collapsible core comprising two annularly-formed members with flat faces arranged to be united to form a body portion having an outer configuration equivalent to the configuration which it is desired to impart to an article to be built thereon, segmental portions of each of said members which are in contacting relation being severed from the balance of said device and removable therefrom, the ends of said removable portion adapted to lap the adjacent ends of said members, said ends provided with means for securing the removable portions in position.

7. A collapsible core comprising two interrupted ring-shaped members adapted to be secured in contacting engagement with each other, and each provided with recesses in their contacting faces, said recesses adapted to register with each other, the point of interruption in the two members being out of alinement with each other and a removable member corresponding in contour to said interrupted members adapted to be interposed in the space formed by the interruption of said members and to lap the adjacent portions thereof, provided with means for securing it in position.

8. A collapsible core comprising two annularly-formed severed members adapted to be secured in lateral contacting engagement with each other, the ends of said members at the point of severance being spaced apart and out of complete registration with each other, said contacting members each provided with recesses in their abutting faces, said recesses adapted to register with each other and a removable wedge-shaped member conforming exteriorly to the outlines of said annular members adapted to be inserted in the space intervening between the severed ends of said members, the ends of said removable member being formed to fit the ends of said annular members and lap adjacent portions thereof, said removable member provided in its lapping portions with means for securing it in position.

9. A collapsible core for manufacturing tires comprising an annular body formed of a plurality of segments, said segments overlapping at their opposing ends, and transversely-extending means projecting through the overlapping ends of the segments for detachably-connecting the segments together, each of said segments of the same contour throughout and each comprising an outer curvilinear portion and a flat inwardly-extending flange formed integral with the inner side of the curvilinear portion.

10. A collapsible core for manufacturing tires comprising an annular body formed of a plurality of segments, each of said segments at a point removed from each end thereof provided with a shoulder, the shoulder at one end being oppositely-disposed with respect to the shoulder upon the other end, the ends of one segment adapted to abut against the shoulder of an adjacent segment whereby the ends of the segments when the segments are set up will overlap, and removable means extending through the overlapping ends of the segments for detachably-connecting the ends of the segments together.

In testimony whereof I have hereunto set my hand in presence of two subscribing witnesses.

JOHN K. WILLIAMS.

Witnesses:
C. E. HUMPHREY,
GLENARA FOX.